INVENTOR.
CLARENCE A. BUTLER

Dec. 1, 1964 C. A. BUTLER 3,158,984
POROUS FABRIC OR STRUCTURE AND THE METHOD OF MAKING THE SAME
Filed Aug. 10, 1962 6 Sheets-Sheet 2

INVENTOR.
CLARENCE A. BUTLER
BY
Teare, Tetzer & Teare
ATTORNEYS

Dec. 1, 1964    C. A. BUTLER    3,158,984
POROUS FABRIC OR STRUCTURE AND THE METHOD OF MAKING THE SAME
Filed Aug. 10, 1962    6 Sheets-Sheet 3

INVENTOR.
CLARENCE A. BUTLER
BY
Teare, Tetju & Teare
ATTORNEYS

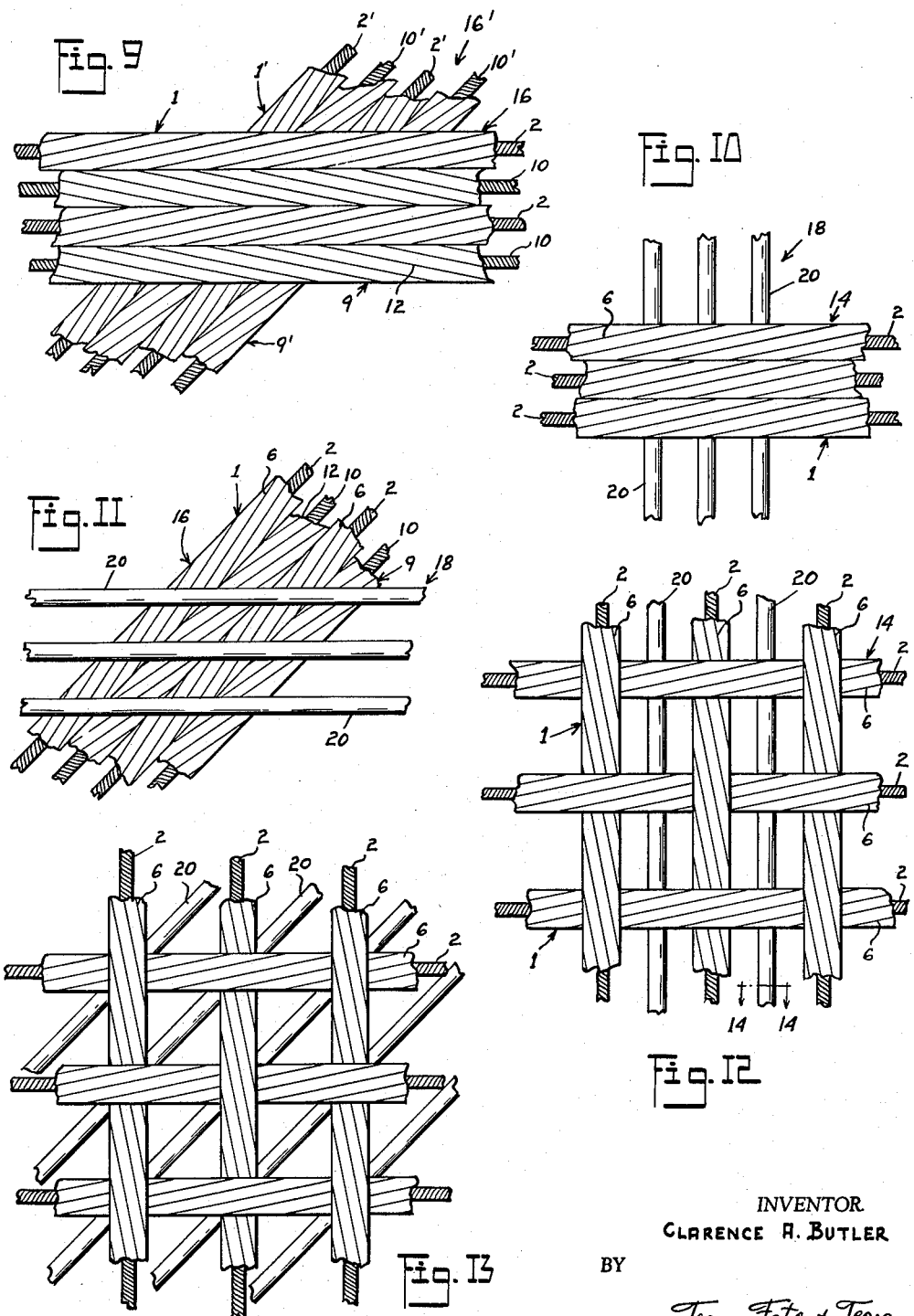

Dec. 1, 1964   C. A. BUTLER   3,158,984
POROUS FABRIC OR STRUCTURE AND THE METHOD OF MAKING THE SAME
Filed Aug. 10, 1962   6 Sheets-Sheet 5

INVENTOR.
CLARENCE A. BUTLER
BY
Teare, Fetzer + Teare
ATTORNEYS

Dec. 1, 1964 C. A. BUTLER 3,158,984
POROUS FABRIC OR STRUCTURE AND THE METHOD OF MAKING THE SAME
Filed Aug. 10, 1962 6 Sheets-Sheet 6

INVENTOR.
CLARENCE A. BUTLER
BY
Teare, Tetzer & Teare
ATTORNEYS

United States Patent Office

3,158,984
Patented Dec. 1, 1964

3,158,984
POROUS FABRIC OR STRUCTURE AND THE METHOD OF MAKING THE SAME
Clarence A. Butler, Cleveland, Ohio, assignor to The Lindsay Wire Weaving Company, Cleveland, Ohio, a corporation of Ohio
Filed Aug. 10, 1962, Ser. No. 216,111
29 Claims. (Cl. 57—144)

This invention relates to porous fabrics or structures comprised of twisted multi-filament cables and the method of making the same which are intended for general use either as a filtering media or for making cylinder covers, endless belts or the like for use with paper making machines.

Generally, it has been experienced that fabrics for use as filtering media, whether made of natural fibers, synthetic fibers or metallic wires, when woven, depend upon the openings in the weave for porosity, since the fibers or wires themselves in general extend in a direction of one the planes of the fabric. Moreover, when the fabric is woven of single yarns, or of cables made of multi-filament yarns, the individual fibers or yarns themselves being non-porous or of a low porosity produce no passage-ways substantially perpendicular to the plane of the fabric thereby resulting in an unsatisfactory and uncontrolled drainage through the fabric.

Heretofore, to have a porosity substantially perpendicular to the plane of the fabric, it was found necessary to produce a felted material of relatively coarse construction in which fibers or yarns were embedded to extend perpendicular to the plane of the fabric to thereby produce the desired permeability through the fabric. However, such felted materials were found not only to be uneconomical from a fabrication and operational standpoint, but were found unsatisfactory is providing a fabric having uniform and controlled drainage characteristics.

Similarly, as applied to paper making belts, for example, it has been experienced that, in addition to the necessary characteristics of corrosion, damage and wear-resistance, such belts must also incorporate the necessary hydraulic characteristics for effectively draining paper stock formed on the belt. Conventional coarse wire belts comprised of interwoven sets of warp and shute wires produced a quick and uncontrolled drainage of the paper stock formed on the belt. Such de-watering with a wire fabric of a coarse mesh resulted in the fine material of the paper stock flowing out as white water before the thin fiber mat could be formed on the belt. Under such conditions, the fiber mat had a greater density over the wires than in the area between the wires, such that wire marks were produced in the structure of the mat itself which could not be brushed or pressed out, as in the case of simple indentations. Moreover, to produce a more uniform paper product, efforts were made to produce a woven wire mesh with a greater resistance to filtration, such that the thin fiber mat would form rapidly on the wire to prevent the loss of fine materials and to maintain the paper stock in a fluid condition for a greater length of time. As a result, paper making belts were conventionally fabricated from a finer wire mesh or by attempting to drive more shute wires into the mesh to further tighten and decrease the open area between the adjacent wires. Heretofore, such efforts to fabricate belts from a finer wire mesh or by forcing more metal into the mesh have been unsatisfactory not only because of the substantially greater cost of such fine mesh fabrics, but because of the relatively shorter life and premature failure of such fabrics when subjected to the high machine speeds which prevail in many paper mill processes.

Therefore, an object of the present invention is to provide a twisted cable construction and the method of making the same which is intended for use as a filtering media having improved characteristics of permeability, corrosion resistance, and durability.

Another object of the present invention is to provide a twisted cable construction comprised of a plurality of twisted thermoplastic filaments of predetermined cross-sectional configurations which is intended either for general use as a filtering media or for use in making endless belts or the like for paper making machines.

A still further object of the present invention is to provide a fabric of a twisted cable construction and the method of making such fabric which is intended either for general use as a filtering media or for use in making endless belts or the like for paper making machines.

A still further object of the present invention is to provide an endless belt for use with paper making machines, comprised of a twisted cable construction and a method of making such belt having improved characteristics of permeability, corrosion resistance and durability.

An additional object of the present invention is to provide a more economical, light weight fabric comprised of a twisted cable construction which is intended either for general use as a filtering media or for use in making endless belts or the like for paper making machines.

Other and further objects of the present invention will be apparent from the following description and claims illustrated in the accompanying drawings, which, by way of illustration, show a preferred embodiment of the present invention and the principles thereof in what is now considered to be the best mode in which to apply these principles. Other forms of the invention, embodying the same or equivalent principles may be applied by those skilled in the art without departing from the scope of the present invention, in the drawings:

FIG. 9 is an enlarged fragmentary view, in plan form, showing another form of a non-woven multi-layer fabric comprised of the twisted cable construction of the present invention;

FIG. 10 is an enlarged fragmentary view, in plan form, showing the novel non-woven fabric construction of FIG. 6 in conjunction with a layer of reinforcing filaments attached to the undersurface thereof;

FIG. 11 is an enlarged fragmentary view, in plan form, showing the novel non-woven fabric construction of FIG.

Figure 5:
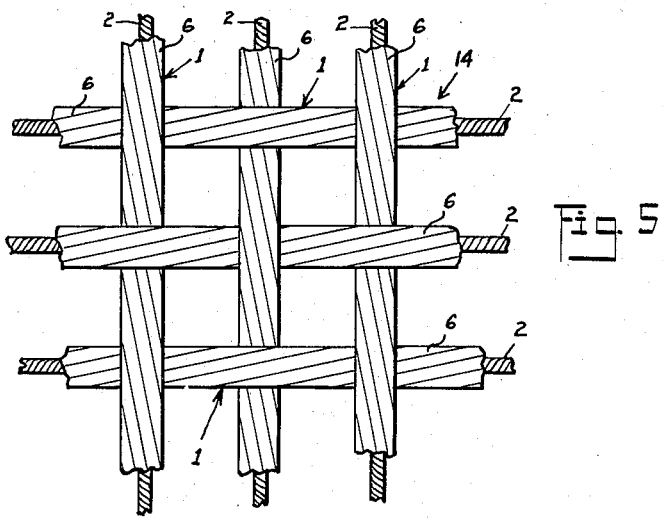
FIG. 5 is an enlarged fragmentary view, in plan form, showing a woven fabric comprised of the twisted cable construction of the present invention.
Figure 14:
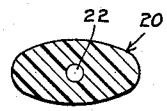
Figure 15:
Figure 37:
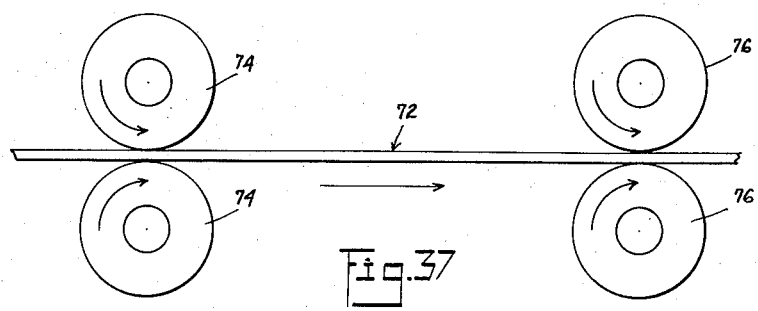
Figure 38:
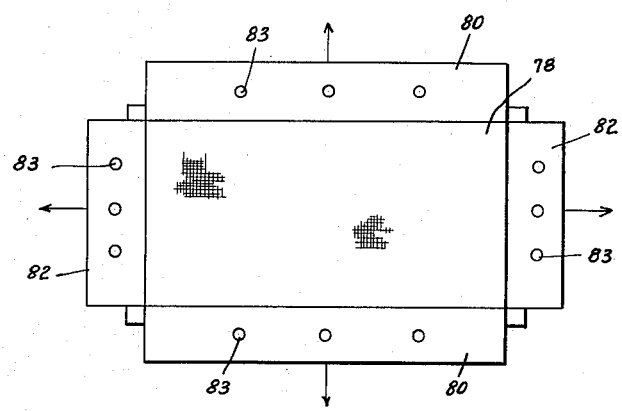
Figure 39:
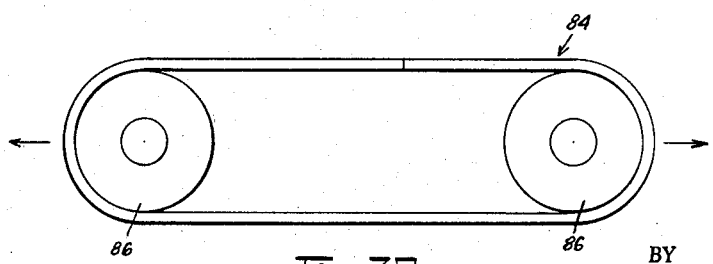

7, in conjunction with a layer of reinforcing filaments attached to the uppersurface thereof;

FIG. 12 is an enlarged fragmentary view, in plan form, showing the novel woven fabric construction of FIG. 5 in conjunction with one form of the reinforcing filaments attached thereto;

FIG. 13 is an enlarged fragmentary view, in plan form, showing the novel woven fabric construction of FIG. 5, in conjunction with another form of the reinforcing filaments attached thereto;

FIG. 14 is a cross-sectional view taken along line 14—14 of FIG. 12, showing a reinforcing filament having a strengthening element embedded therein;

FIG. 15 is a sectional view showing a modification of the reinforcing filament of FIG. 14;

FIGS. 16 through 36, inclusive, are vertical cross-sectional views showing modified shapes of the twisted filaments utilized in forming the twisted cable construction of the present invention;

FIG. 37 is a diagrammatic illustration showing a fabric made from the novel twisted cable construction of the present invention, in one form, passing between spaced pairs of rolls for expanding the fabric longitudinally in accordance with the principles of the present invention;

FIG. 38 is a diagrammatic illustration showing a fabric made from the novel twisted cable construction of the present invention, in another form, mounted intermediate clamping members for expanding the fabric in a transverse and longitudinal direction in accordance with the principles of the present invention;

FIG. 39 is a diagrammatic illustration showing an endless belt made from the novel twisted cable construction of the present invention, mounted on stretcher rolls for expanding the belt longitudinally in accordance with the principles of the present invention.

Briefly, it has been found that a fabric suitable for use as a filtering media having improved characteristics of permeability, corrosion resistance and durability may be obtained by providing a plurality of twisted cables which may be attached together by suitable weaving or nonwoven techniques to form a desired fabric construction. In such case, it is preferred that the individual twisted cable construction be achieved first, by independently twisting a plurality of filaments having a predetermined cross-sectional configuration, and then by twisting such filaments together or by twisting such filaments, as a unit, about a central twisted filament having its own predetermined cross-sectional configuration to form a unitary structure. By varying the cross-sectional configuration, amount and direction of twist imparted to the individual filaments there is achieved a controlled permeability through the twisted cable which is not dependent upon the porosity of the filaments themselves nor upon the spacing between the adjacent filaments, as in the case of conventional fabric constructions. Moreover, by controlling the degree and direction of twist imparted to the individual filaments, there may be provided a filtering media having an improved permeability which is characterized as being substantially perpendicular to the plane of the media.

Accordingly, in addition to providing a fabric for general use as a filtering media, such a twisted cable construction has been found to be especially suitable for making endless belts or the like for use with paper making machines. For example, by providing a twisted cable construction, such as to maintain a predetermined ratio of specific surface area to a drainage area, there may be obtained an endless belt which provides a more efficient utilization of paper stock while incorporating optimum drainage through the belt thereby producing a superior paper product.

Furthermore, it has been found that materials, such as thermoplastics, when expanded by predetermined amounts and undercontrolled temperature conditions, achieve superior characteristics of strength and durability which are highly suitable in making endless belts and the like for use with paper making machines. Moreover, by expanding various fabrics of the present invention, there results a preferred orientation of the material in the direction of expansion which not only increases the strength and durability of the material, but which also stabilizes the dimensional characteristics of the material to thereby provide a fabric or belt with permanent and uniform hydraulic characteristics.

Figure 1:
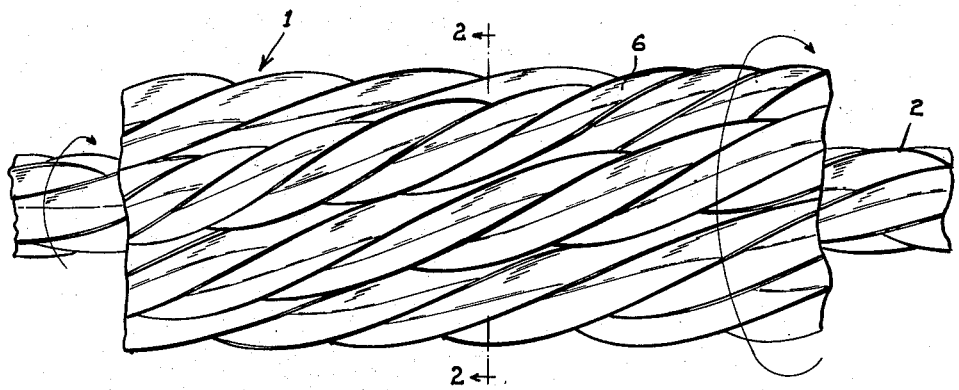
FIG. 1 is an enlarged fragmentary view, in elevation, showing one form of the twisted cable construction of the present invention.
Figures 2, 4:
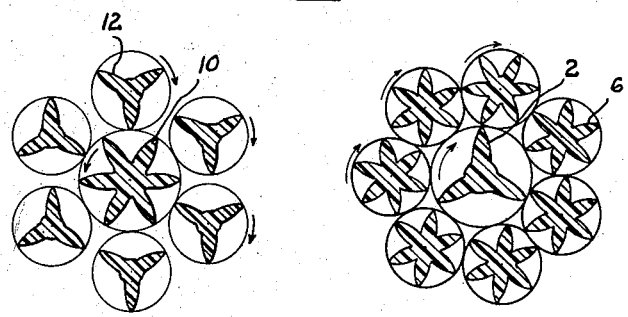
FIG. 2 is a cross-sectional view taken along line 2—2 of FIG. 1.
FIG. 4 is a cross-sectional view taken along line 4—4 of FIG. 3.

Referring now more particularly to the drawings, FIGS. 1 and 2 diagrammatically illustrate one form of the twisted cable construction embodying the present invention. In this form, the cable designated generally by the reference character 1, may be formed by encircling a central twisted filament with a plurality of outer twisted filaments to form a bundle and then by twisting the bundle of encircling filaments, as a unit, relative to the central filament to form a twisted cable. As shown, the central filament 2 may initially be shaped, by suitable molding or extruding techniques, into a generally star-shaped configuration, in vertical cross-section, with three equally spaced lobes. Prior to forming the twisted cable itself, the central filament 2 is preferably twisted with about five turns per inch of length in a clockwise direction, as shown by the arrow, to provide the filament with a desired porosity. In this form, the central filament is preferably encircled with seven outer filaments 6 which may be similarly shaped to provide a generally star-shaped configuration, in vertical cross section, with six equally spaced lobes. In a like manner, prior to being formed into a twisted cable, each encircling filament 6 is preferably twisted under controlled temperature conditions with about five turns per inch of length in a clockwise direction, as shown by the arrows, such that each individual filament in itself has a desired porosity substantially perpendicular to the plane of the cable. Having shaped and twisted the filaments in the manner prescribed, the outer filaments 6 may then be spaced radially to encircle the central filament 2, whereupon, the outer filaments 6 may then be twisted about one turn in four inches of length, as a unit, around the central filament 2 and in a clockwise direction to provide the cable with the desired hydraulic characteristics.

In this form, while for purposes of disclosure, the cable 1 has been illustrated as comprising a single central filament and seven outer encircling filaments, it is to be understood that the size, number and cross-sectional configuration of the respective filaments may vary in each case, for example, dependent upon the desired specific surface area, permeability and porosity required for a particular application of the fabric or filtering media comprised of a plurality of such cables, as will hereinbefore be more fully described.

Figure 3:
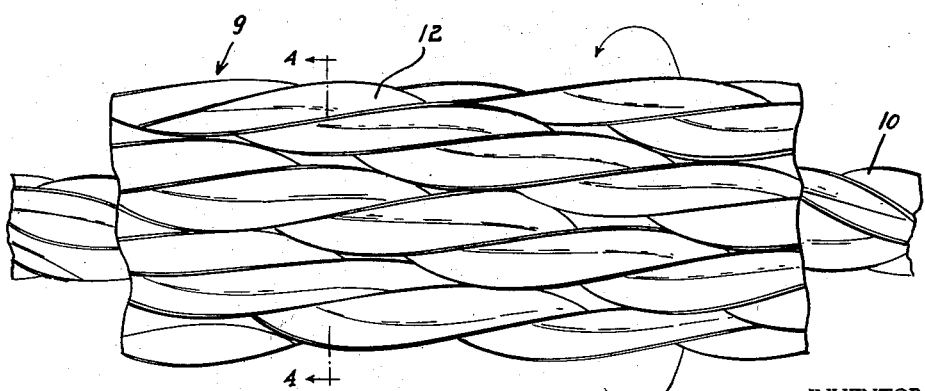
FIG. 3 is an enlarged fragmentary view, in elevation, showing another form of the twisted cable construction of the present invention.

In another form of the twisted cable construction, such as shown generally at 9 of FIGS. 3 and 4, the arrangement of the filaments may be reversed, such that a star-shaped filament 10 having six lobes may be encircled by six star-shaped filaments 12 having three lobes. As shown, the central filament 10 may be individually twisted about five turns per inch of length, in a counterclockwise direction, with the outer encircling filaments 12 being twisted about five turns per inch of length in the opposite or clockwise direction, as shown by the arrows. In this form, the outer encircling filaments 12 may then be twisted about one turn in four inches of length, as a unit, around the central filament and in a counterclockwise direction to provide the cable with the desired hydraulic characteristics.

Figure 4A:
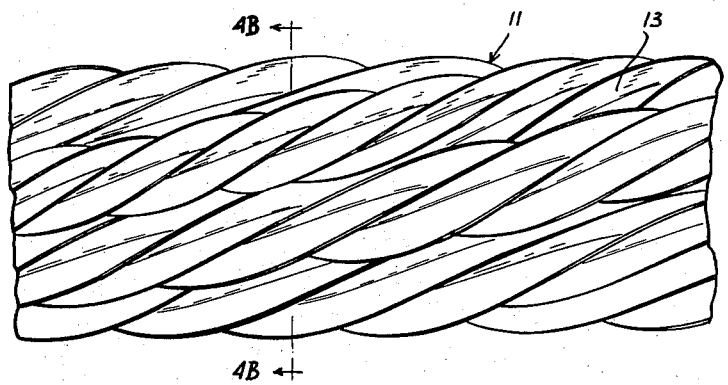
FIG. 4A is an enlarged fragmentary view, in elevation, showing another form of the twisted cable construction of the present invention.
Figure 4B:
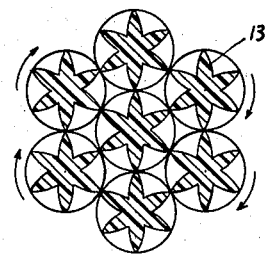
FIG. 4B is a cross-sectional view taken along line 4B—4B of FIG. 4A.

In another form, the cable shown generally at 11 of FIGS. 4A and 4B may be formed without the central filament by first twisting a plurality of star-shaped filaments 13, independently; and then by twisting the filaments together to form a unitary twisted cable. As in the case of the central filament construction, the filaments 13 may be independently twisted about five turns per inch of length in a clockwise or counterclockwise direction and may then be twisted about one turn in four inches of length in a clockwise or counterclockwise direction to form the cable.

In each of the foregoing instances, there may be a variation in the permeability of the cable dependent upon the direction of twist imparted to the respective filaments; hence, the character of the twisting may vary in each case dependent upon the hydraulic characteristics desired for a particular application of the cable. For example, a greater permeability would be imparted to the cable in the case where all the respective filaments are twisted in the same direction (FIG. 1) rather than in the case where the filaments are twisted in opposite directions. Similarly, though the respective filaments have been disclosed as being individually twisted with about five turns per inch of length and then being twisted, as a unit, with about one turn in four inches of length, it is to be understood that the degree of twist may also vary in each case dependent upon the specific surface area and permeability required for a given application of the cable or for a particular application of a woven or non-woven fabric made of a plurality of such cables.

In this regard and with reference to FIG. 5, of the drawings, a porous woven fabric, shown generally at 14, may be formed by weaving together a plurality of the twisted cables 1 embodying the present invention to form a unitary fabric construction. In this connection, it is to be recognized that various weaving techniques may be employed, as known in the art, to provide the desired fabric. However, by twisting the central filaments 2 and the outer encircling filaments 6, in the manner prescribed, to form the desired twisted cable construction, each individual filament in itself has a porosity substantially perpendicular to the plane of the fabric. Moreover, fabrics formed either by weaving or non-woven techniques may be produced, such that the permeability of the fabric is achieved through the amount and direction of twist imparted to the individual filaments and is not dependent on the particular weaving techniques employed, as in the case of conventional fabric constructions.

Figure 6:
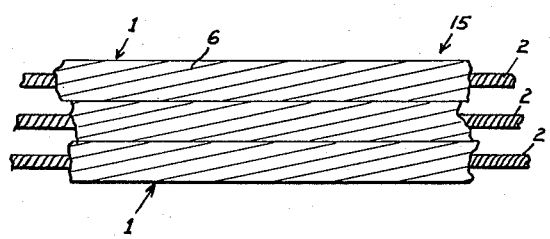
FIG. 6 is an enlarged fragmentary view, in plan form, showing a non-woven fabric comprised of one form of the twisted cable construction of the present invention.

As illustrated in FIG. 6, of the drawings, a porous non-woven fabric, shown generally at 15, may be formed by attaching together in side-by-side relation a plurality of the twisted cables 1 embodying the present invention such as to form a unitary, co-planar fabric layer. In this form, the individual filaments 2 and 6 comprising each cable may be twisted in the same direction relative to those of an adjacent cable while the adjacent cables are similarly twisted in the same direction relative to one another. The relative twisting between adjacent cables becomes apparent when it is considered that the outer encircling filaments 6 comprising each cable are twisted, as a unit, in the same direction relative to the twisting of the outer encircling filaments 6 of an adjacent cable.

Figure 7:
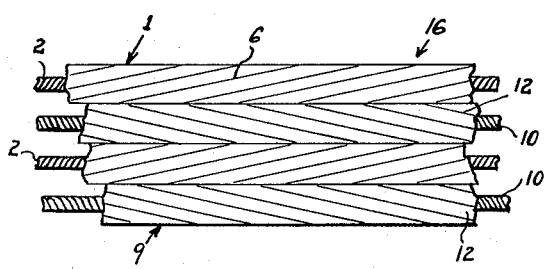
FIG. 7 is an enlarged fragmentary view, in plan form, showing a non-woven fabric comprised of another form of the twisted cable construction of the present invention.

In another form, FIG. 7 illustrates a construction wherein a plurality of the cables designated generally at 1 and 9, may be alternately disposed and attached together in side-by-side relation to form a co-planar fabric, shown generally at 16. As noted, the central filaments 10 of the cables 9 may be twisted counterclockwise in opposition relative to the twisting of the outer encircling filaments 12 while the outer filaments in turn may be twisted counterclockwise, as a unit, around the central filaments. In a like manner, the central filaments 2 of the cables may be twisted in the same clockwise direction relative to the twisting of the outer filaments 6 while the latter are twisted in a clockwise direction, as a unit, around the central filaments 2 to provide the desired fabric construction.

In the foregoing examples, though for purposes of disclosure, the woven or non-woven fabrics have been illustrated as being made from the twisted cable constructions of FIGS. 1–4, it is to be understood that such woven or non-woven fabric may also be made from the twisted cable construction illustrated in FIGS. 4A and 4B. Moreover, the specific surface area, permeability and porosity of fabrics comprised of such twisted cable constructions may not only be controlled by a relative variation in the twisting of the individual filaments comprising a cable, but may be further controlled by a variation in the arrangement and twisting of the cables themselves. Though for purposes of disclosure, the non-woven fabric has been diagrammatically illustrated as comprising a co-planar layer of cables twisted in the same direction or alternately twisted in opposite directions, it is to be understood that various other arrangements of the same or similar twisted cable constructions may achieve equally beneficial results in accord with the principles of the present invention. For example, the alternately disposed cables comprising the non-woven fabric may be shifted in a longitudinal direction relative to an adjacent cable in an amount sufficient to provide openings between the adjacent cables such as to achieve a desired permeability to the fabric. In other cases, it may be desirable to twist the alternate cables by a greater or lesser amount, such as to vary the relative pitch between adjacent filaments, to obtain the desired fabric permeability.

Figure 8:
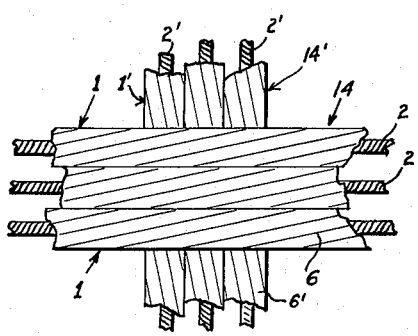
FIG. 8 is an enlarged fragmentary view, in plan form, showing one form of a non-woven multi-layer fabric comprised of the twisted cable construction of the present invention.

In another form shown diagrammatically at FIGS. 8 to 13, when the single layer fabric construction does not have the desired hydraulic characteristics or sufficient strength to perform the necessary mechanical functions in operation, it may be desirable to form the woven or non-woven fabric as a multiple layer construction. Such a condition may exist, for example, in paper mill operations where the desired hydraulic characeristics require the use of an endless belt with relatively thin and delicate fabrics or filtering media constructions. In such case and as shown at FIG. 8, the upper fabric layer 14 may be provided with a second co-planar layer 14′ of twisted cables 1′. In this form, the individual cables 1′ of the second co-planar layer 14′ may be twisted in the same clockwise direction relative to the cables 1 of the first co-planar layer 14 and may be attached transversely or substantially at right angles relative to the cables of the first layer to provide a non-woven fabric with the desired hydraulic characteristics.

In another form, shown diagrammatically in FIG. 9, the upper co-planar layer 16 of alternately twisted cables 1 and 9 may be provided with a second co-planar layer 16′ of alternately twisted cables 1′ and 9′. In this form, the second co-planar layer 16′ of alternately twisted cables may be attached at an angle relative to the upper layer of cables, such as to provide the desired fabric permeability.

In further modifications of the porous non-woven fabric construction shown at FIGS. 10 and 11, the upper co-planar layer 14 of similarly twisted cables 1 may be provided with a second co-planar layer 18 of plain or non-twisted reinforcing filaments 20 which may be attached to the under surface of the upper layer of co-planar twisted cables. In this form, the reinforcing filaments 20 may be attached to extend transversely or at right angles relative to the twisted cables 1 comprising the upper layer of the fabric. As shown in FIG. 11, the co-planar layer 18 of reinforcing filaments 20 may be attached to the upper surface of the co-planar layer 16 of alternately twisted cables 1 and 9. Here, the upper layer 18 of reinforcing filaments 20 may be attached to extend at an angle relative to the alternately twisted cables 1 and 9 comprising the lower layer of the fabric.

In another modification, the porous woven fabric construction, shown generally at 14 of FIGS. 12 and 13, may be similarly provided with a layer 18 plain or non-twisted reinforcing filaments 20. In such case, the co-planar layer 18 of reinforcing filaments may be attached to extend transversely or at an angle relative to the undersurface of the inter-woven twisted cables 1 and spaced apart so as to provide the desired pereability through the fabric.

In the foregoing modifications, the plain or non-twisted reinforcing filaments 18 may be of a single strand construction and may be made of any suitable material which may be formed into the desired filament shape, such as metal, thermoplastic, glass or the like. Additionally, and as shown in vertical cross section at FIGS. 14 and 15, the reinforcing filaments may be strengthened by the incorporation of a desired strengthening means. Moreover, and as shown in FIG. 14, the thermoplastic filaments illustrated generally at 20, may be formed with a metallic wire 22 embedded therein. In another form, to achieve the desired strength characteristics, the thermoplastic filaments 20 may be impregnated with between about 20% to 40%, by weight, of a filler material 24, such as glass flakes, comprised of borosilicate or the like, best shown at FIG. 15.

Figure 16:
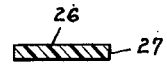
Figure 17:
Figure 18:
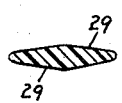
Figure 19:
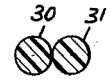
Figure 20:
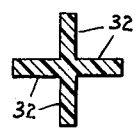
Figure 21:
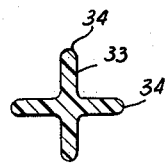
Figure 22:
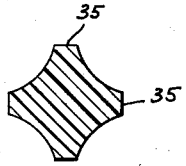
Figure 23:
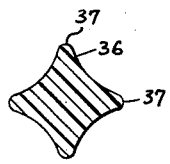
Figure 24:
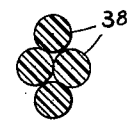
Figure 25:
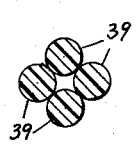
Figure 26:
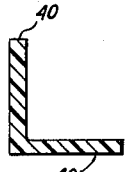
Figure 27:
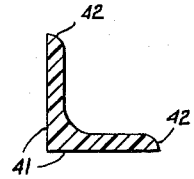
Figure 28:
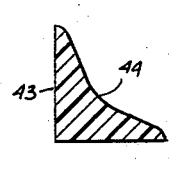
Figure 29:
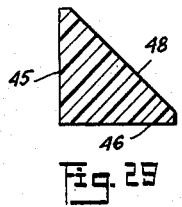
Figure 30:
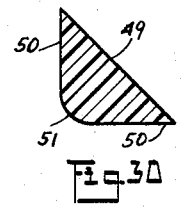
Figure 32:
Figure 31:
Figure 33:
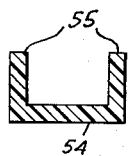
Figure 34:
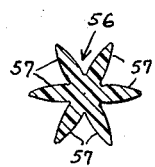
Figure 35:
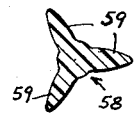
Figure 36:
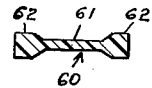

The individual filaments comprising the twisted cables may be formed in any predetermined shape which is suitable for increasing the specific surface area of the fabric and which will provide the necessary porosity between adjacent filaments and cables comprising the fabric. Typical shapes which are useful for such filaments are indicated generally at FIGS. 16 through 36, inclusive. FIG. 16 illustrates a quadrilateral configuration, in vertical cross section, in the form of a flat ribbon having flat side portions 26 and 27. FIG. 17 shows a similar quadrilateral configuration having rounded end portions 28. FIG. 18 shows the filaments as being generally parabolic, or in the form of a double concave, in vertical cross-section, having oppositely disposed concave side portions 29. FIG. 19 shows the filaments as comprising two generally circular portions 30 and 31 bonded together to define a generally figure-eight configuration, in vertical cross section. FIG. 20 shows the filaments to be of a generally cross-shaped configuration, in vertical cross-section, having four oppositely disposed arm portions 32. FIG. 21 shows a similar configuration wherein the arms 33 are generally rounded 34 at their free ends. FIG. 22 shows the filaments as being generally star-shaped, in vertical cross section, having four oppositely disposed points 35. FIG. 23 shows a similar configuration, wherein the points 36 may be rounded at their free ends 37. FIG. 24 shows a modification of the cross-shaped configuration, wherein four individual filaments 38 may be bonded together to form the desired filament configuration. Similarly, FIG. 25 shows a modification of the cross shaped configuration, wherein four individual strands 39 may be equally spaced and bonded together as illustrated. FIG. 26 shows the filaments to be of a generally L-shaped configuration, in vertical cross section, having two leg portions 40 extending at substantially right angles to one another, whereas, in FIG. 27, the free ends of the leg portions 41 may be generally rounded as at 42. FIG. 28 shows a triangular configuration, in vertical cross-section, having two side portions 43 which may be closed across their free ends by a generally serpentine portion 44. FIG. 29 shows a right triangular configuration, in vertical cross-section, having side portions 45 and 46 extending at right angles to one another and closed across their free ends by a side portion 48 in the form of a hypotenuse. FIG. 30 shows a modification of the triangular configuration as being generally truncated, in vertical cross-section, having a base portion 49, angularly inwardly extending side portions 50 and a generally flat or rounded top portion 51. FIG. 31 shows the filament as being generally semi-circular 52 in vertical cross-section, whereas FIG. 32 illustrates the semi-circular configuration as being provided with a generally rounded, longitudinally extending channel 53. FIG. 33 shows the filament as being generally U-shaped, in vertical cross-section, having a base portion 54 and two generally vertically upstanding flange portions 55 extending therefrom. FIG. 34 shows the filament as being of a generally star-shaped configuration 56, in vertical cross-section, having 6 oppositely disposed lobes 57. FIG. 35 shows a similar star-shaped configuration 58 having 3 evenly spaced lobes 59 whose center lines lie at an obtuse angle relative to one another. FIG. 36 shows the filament to be of a dumbbell shaped configuration 60 having a reduced portion 61 located intermediate two enlarged end portions 62 and made integral therewith.

Accordingly, where reinforcing filaments are to be used in conjunction or in combination with the twisted cable construction to impart a greater durability to the fabric, the aforementioned, or similarly shaped filaments may be utilized as a reinforcement to obtain the desired specific surface area and the required porosity between adjacent twisted cables. In this regard and for purposes of defining the shape of the individual filaments, comprising the twisted cables, the geenrally non-circular configurations approximating the circular form may be referred to in terms of a closed plane curve, such as, for example, the eliptical and parabolic configurations. Other regular and/or irregular configurations may be referred to in terms of a closed plane having at least one included angle, such as, for example, the triangular, quadrilateral and polygonal configurations. As applied to the making of endless belts for paper making machines, the various cross-sectional shapes of the individual twisted filaments comprising the twisted cables and, as shown in the drawings, are preferably of a size which may be circumscribed by a circle having a diameter of between about 0.010 inch and 0.150 inch.

As applied to thermoplastic materials, the attachment between the twisted filaments of a single twisted cable and the attachment between a plurality of such twisted cables to form a porous fabric may be accomplished by one of several methods. For example, the attachment may be achieved by the use of solvent cementing, thermofusion techniques, or by the use of suitable adhesives, such as those known in the art. Moreover, the thermofusion techniques may be accomplished by the direct application of heat through platens, rollers, or by generating heat within the filaments themselves, such as by high frequency dielectric heating, ultra-sonics, or by the use of heated air or liquids. In some cases, pressure may be utilized in conjunction with the aforementioned thermofusion or solvent cementing techniques to effect the desired attachment between the respective filaments and cables.

In accord with the principles of the present invention, any material, whether made of natural fibers, synthetic fibers, or metallic wires having the desired characteristics of wear, resistance, corrosion resistance, and durability, which may be shaped and twisted into the desired configuration may be suitable for making such twisted cable construction. It has been found, however, that some thermoplastic materials are particularly suitable for such application, particularly when utilized in making endless belts for paper making machines. Such thermoplastic material may include cellulose nitrate, cellulose acetate, cellulose acetate-butyrate, polystyrene, polyethylene, polycarbonate, polypropylene, linear polyethylene, polyvinyl chloride, vinyl esters, vinylidene chloride, styrene acrylonitrile, styrene butadiene, polytetrafluoroethylene, polychlorotrifluoroethylene, acrylonitrile resin rubber, nylon, methyl methacrylate, and ethyl cellulose.

Preferred among the above mentioned thermoplastic materials are polycarbonate and nylon which have the property that when expanded under the proper temperature conditions, the molecular chains, of which the plastic is comprised, become oriented in the direction of orientation, thus greatly increasing the strength and durability of the thermoplastic material. In order that the desired result be obtained, the molecular chains comprising the thermoplastic material must have sufficient mobility so that they are free for movement and become aligned with neighboring molecular chains of the composition. In cases where heat may be applied to the material to promote such mobility, the preferred temperature is commonly referred to as the "glass transition temperature." Conversely, when the "glass transition temperature," is exceeded for a substantial length of time, such as may occur in the normal use of an endless belt in paper making operations, the orientation and beneficial effects of such orientation become reduced or are lost.

Moreover, when a material, such as polycarbonate, is expanded to produce orientation at temperatures for that material within the "glass transition temperature" of between 250° to 310° F. and is subsequently used at temperatures substantially below the lower operating limit of 250° F. for that material, the strength of the material is not only increased but the preferred orientation of the material is retained and the material does not return to its original shape prior to such orientation. Accordingly, to obtain the desired molecular orientation of the material, it is preferred that the "glass transition temperature" of the material be kept substantially above the maximum temperature at which the material may be subjected in actual use. In this regard, and for purposes of definition, when reference is made to the "glass transition temperature," there is intended the temperature demarcation between the lower temperature wherein the individual molecules of plastic material remain relatively fixed and the higher temperature, wherein the individual molecules of the material are free for movement relative to one another.

Expanding of the twisted cables to provide the desired molecular orientation of the thermoplastic material comprising the cable may be accomplished by one of several modified forms. As shown at FIG. 37, the individual twisted cables may be attached together, as aforementioned, to form the desired fabric construction, shown diagrammatically at 72. In this form, the fabric may be stretched longitudinally between a first pair of oppositely disposed rollers 74 and a second pair of similar rollers 76 which may be actuated for rotation in the same direction, but which are coordinated to rotate at higher predetermined speeds relative to the first pair of rollers 74. Such relative rotation between the respective pairs of rollers allows the twisted thermoplastic cables comprising the fabrics to be expanded and oriented to any predetermined amount, as desired.

In another form, as shown at FIG. 38, the fabric 78 may be stretched by gripping the edge portions thereof between two pairs of oppositely disposed clamping members 80 and 82, which may be secured to the fabric by suitable fastening means 83. To expand or stretch the fabric, the clamping members may be actuated by suitable mechanical or motor power means (not shown) to cause the members to move away from one another, as shown by the arrows, whereby the fabric may be expanded in a transverse and/or longitudinal direction, as desired.

Moreover, in another form, the twisted thermoplastic cables comprising the fabric may be attached together, by means of the aforementioned thermo-fusion or solvent cementing techniques to form an endless belt, shown generally at 84 of FIG. 39. In such case, it is preferred that the belt 84 be mounted in its finished form on oppositely disposed stretcher rolls 86 which are adapted for longitudinal movement toward and away from one another, as shown by the arrows. Moreover, relative movement between the stretcher rolls imparts the desired amount of expansion to the twisted cables.

In this regard, though we have illustrated several modified forms by which the fabric or belt may be expanded, it is to be understood that in some cases it may be desirable to expand the individual twisted cables prior to attaching them together to form the desired fabric. It has been found, preferable however, to expand the thermoplastic material when the twisted cables are first formed into an endless belt or the like, whereby there is obtained a greater uniformity in orientation between the individual thermoplastic filaments comprising the belt. The amount of expanding imparted to the thermoplastic material may vary in each case dependent upon the desired molecular orientation of the material, and upon the spacing between the twisted filaments required to produce the hydraulic characteristics suitable for a given application of the fabric. We have found, for example, that by expanding a thermoplastic material, such as a polycarbonate, to between about 80% to 100% of its initial length, and at a temperature within the "glass transition temperature" for that material, there is obtained the desired orientation and drainage characteristics suitable for making endless belts for use with paper making machines.

It can be seen from the foregoing description that a fabric comprised of the twisted cable construction of the present invention provides many important advantages. Such a fabric construction has the important advantage of possessing sufficient physical strength for a prolonged wear life in conjunction with the advantage of providing a filtering media having a permeability which is substantially perpendicular to the plane of the media. When utilizing such twisted cable construction in the making of endless belts for paper making machines, there results a controlled filtration of the paper stock formed on the belt, while at the same time reducing the loss of fine materials through the belt. It can be seen, therefore, that by maintaining a predetermined ratio of specific surface area to drainage area by means of such a twisted cable construction, there is obtained an endless belt which provides a more efficient utilization of paper stock while incorporating optimum drainage characteristics for producing a superior paper product.

Though we have selected to illustrate the principles of embodying the present invention, with particular reference to the fabrication of paper making belts, it is to be understood that such cable twisted construction may also be utilized in other similar applications. The utilization of such twisted cable construction may vary in use from a filter or separator for liquids and solids, to a construction which may be substantially impervious to moisture, but which allows the easy passage of air or gas therethrough.

Thus, while it has been illustrated herein a preferred embodiment of the present invention, it is to be understood that changes and variations may be made by those skilled in the art without departing from the spirit and scope of the appended claims.

I claim:

1. A porous cable for use as a filter media having improved strength and hydraulic characteristics comprising, a plurality of mono-filaments, said mono-filaments being substantially non-circular in cross-sectional configuration and being independently twisted relative to one another to provide a predetermined porosity therethrough, and all of the said mono-filaments being twisted together into a bundle to provide a unitary structure having a predetermined permeability therethrough.

2. A cable in accordance with claim 1, wherein all of said mono-filaments comprise an elongated body portion of polymeric material, and wherein each of said mono-filaments includes a plurality of integral projections, said projections being axially co-extensive with said body portion and being spaced circumferentially of said body portion.

3. A cable according to claim 1, wherein each of said individual filaments is twisted independently of the other a predetermined number of turns in one circular direction, and wherein all of said filaments are twisted together a predetermined number of turns in the same circular direction to form a unitary structure.

4. A cable according to claim 1, wherein all of said filaments are twisted together a predetermined number of turns in a circular direction, different from the direction of twist of the individual filaments to form a unitary structure.

5. A porous cable for use as a filter media having improved strength and hydraulic characteristics comprising, a central mono-filament and a plurality of outer surrounding mono-filaments, each of said surrounding mono-filaments being substantially non-circular in cross-sectional configuration and being independently twisted relative to one another by an amount sufficient to provide a predetermined porosity therethrough, and said surrounding mono-filaments being twisted together around said central mono-filament into a bundle in an amount sufficient to provide a unitary structure having a predetermined permeability therethrough.

6. A cable according to claim 5, wherein said central mono-filament and said outer mono-filaments are twisted a predetermined number of turns in one circular direction, and wherein said outer mono-filaments are twisted together around said central mono-filament a predetermined number of turns in the same circular direction to form a unitary structure.

7. A cable according to claim 5, wherein said outer mono-filaments are twisted together around said central mono-filament a predetermined number of turns in a circular direction, different from the direction of twist of the central mono-filament to form a unitary structure.

8. A porous fabric for use as a filter media having improved strength and hydraulic characteristics comprising, a plurality of cables attached together to form a porous unitary structure, each of said cables including a plurality of substantially non-circular mono-filaments twisted independently of one another in an amount sufficient to provide a predetermined porosity therethrough, and all of said mono-filaments being twisted together into a bundle in an amount sufficient to provide a unitary structure having a predetermined permeability therethrough.

9. A fabric in accordance with claim 8, wherein all of said mono-filaments comprise an elongated body portion of polymeric material, and wherein each of said mono-filaments includes a plurality of integral projections, said projections being axially coextensive with said body portion and being spaced circumferentially of said body portion.

10. A fabric according to claim 8, wherein each of said cables includes a central mono-filament and a plurality of outer mono-filaments, each of said mono-filaments being twisted independently of one another, and said outer mono-filaments being twisted together around said central mono-filament to form a unitary structure.

11. A fabric according to claim 10, wherein said cables are interwoven to form a porous structure.

12. A fabric according to claim 11, wherein the porous structure is in the form of an elongated interwoven sheet having the ends of the cables attached together to provide a woven belt suitable for use with paper making machines.

13. A fabric according to claim 8, wherein each of said individual mono-filaments are twisted independently of the other a predetermined number of turns in one circular direction and wherein all of said mono-filaments are twisted together a predetermined number of turns in the same circular direction to form a unitary structure.

14. A fabric according to claim 8, wherein all of said mono-filaments are twisted together a predetermined number of turns in a circular direction different from the direction of twist of the individual mono-filaments to form a unitary structure.

15. A fabric according to claim 8, wherein the mono-filaments of alternately disposed cables are twisted in one circular direction and the mono-filaments of intermediately disposed cables are twisted in a different circular direction.

16. A fabric according to claim 8, wherein a plurality of plain filaments are attached to said cables and adapted to act as a supporting means therefor.

17. A fabric according to claim 8, wherein the porous fabric is in the form of an elongated sheet having the ends of the cables attached together to provide an endless belt suitable for use with paper making machines.

18. A fabric according to claim 8, wherein said cables are interwoven to form a porous structure.

19. A non-woven porous fabric for use as a filter media having improved strength and hydraulic characteristics comprising, a first layer of co-planar cables, a second layer of co-planar cables attached to said first layer of co-planar cables, each of said cables including a plurality of substantially non-circular mono-filaments twisted independently of one another in an amount sufficient to provide a predetermined porosity therethrough, and all of said mono-filaments being twisted together into a bundle in an amount sufficient to provide a unitary structure having a predetermined permeability therethrough.

20. A fabric suitable for use as a filter media, comprising a first layer of co-planar cables, a second layer of co-planar cables attached to said first layer of co-planar cables to form a porous structure, each of said cables including a plurality of filaments twisted independently of one another, and all of said filaments being twisted together to form a unitary structure, and wherein the filaments of alternately disposed cables of each layer are twisted in one circular direction and the filaments of intermediately disposed cables of each layer are twisted in a different circular direction.

21. A fabric suitable for use as a filtering media, comprising a first layer of co-planar cables, a second layer of co-planar cables attached to said first layer of co-planar cables to form a porous structure, each of said cables including a plurality of filaments twisted independently of one another, and all of said filaments being twisted together to form a unitary structure, and wherein the porous structure is in the form of an elongated sheet having the ends of the cables attached together to provide an endless belt suitable for use with paper making machines.

22. A method of making a porous cable for use as a filtering media having improved strength and hydraulic characteristics comprising the steps of providing a plurality of mono-filaments having substantially non-circular cross-sectional configurations, twisting the mono-filaments independently of one another by an amount sufficient to provide a predetermined porosity therethrough, and then twisting all of the mono-filaments together into a bundle by an amount sufficient to provide a unitary structure having a predetermined permeability therethrough.

23. A method according to claim 22, comprising twisting each of said individual mono-filaments independently of one another a predetermined number of turns in one circular direction and then twisting all of the mono-filaments together a predetermined number of turns in the same circular direction to form a unitary structure.

24. A method according to claim 22, comprising twisting all of said mono-filaments together a predetermined number of turns in a circular direction different from the direction of twist of the individual mono-filaments to form a unitary structure.

25. A method of making a porous cable for use as a filtering media having improved strength and hydraulic characteristics comprising the steps of providing a plurality of mono-filaments having substantially non-circular cross-sectional configurations, twisting the mono-filaments independently of one another by an amount sufficient to provide a predetermined porosity therethrough, and then twisting all of the mono-filaments together into a bundle around at least one of said mono-filaments by an amount sufficient to provide a unitary structure having a predetermined permeability therethrough.

26. A method according to claim 25, wherein each of said mono-filaments is twisted independently of the other a predetermined number of turns in one circular direction and wherein all of said mono-filaments are twisted together around at least one of said independently twisted mono-filaments a predetermined number of turns in the same circular direction to form a unitary structure.

27. A method according to claim 25, wherein all of said mono-filaments are twisted together around at least one of said independently twisted mono-filaments a predetermined number of turns in a different circular direction from that of the independently twisted mono-filaments.

28. A method in accordance with claim 25, comprising subjecting the porous cable to an expanding operation, said expanding operation including the steps of stretching the cable at a temperature between about 250° F. and 310° F. to orient the mono-filaments in the direction of expansion.

29. A method of making a porous woven fabric for use as a filter media having improved strength and hydraulic characteristics comprising the steps of providing a plurality of mono-filaments having a substantially non-circular cross-sectional configuration, twisting the mono-filaments independently of one another by an amount sufficient to provide a predetermined porosity therethrough, twisting all of the mono-filaments together into a porous cable by an amount sufficient to provide a predetermined permeability therethrough, and then weaving a plurality of such porous cables together to form a porous unitary fabric.

References Cited in the file of this patent
UNITED STATES PATENTS

| | | |
|---|---|---|
| 894,172 | Bayne et al. | July 21, 1908 |
| 1,695,595 | Larned | Dec. 18, 1928 |
| 1,867,157 | Kingman | July 12, 1932 |
| 1,976,491 | Gottschalk | Oct. 9, 1934 |
| 2,354,435 | Stedman | July 25, 1944 |
| 2,743,511 | Genovese | May 1, 1956 |
| 2,903,021 | Holden et al. | Sept. 8, 1959 |
| 2,908,065 | Hinz | Oct. 13, 1959 |
| 2,932,078 | Wilson | Apr. 12, 1960 |
| 2,963,850 | Rosenblatt | Dec. 13, 1960 |